United States Patent

Otero

[15] 3,696,297

[45] Oct. 3, 1972

[54] BROADCAST COMMUNICATION SYSTEM INCLUDING A PLURALITY OF SUBSCRIBER STATIONS FOR SELECTIVELY RECEIVING AND REPRODUCING ONE OR MORE OF A PLURALITY OF TRANSMITTED PROGRAMS EACH HAVING A UNIQUE IDENTIFYING CONE ASSOCIATED THEREWITH

[72] Inventor: Richard J. Otero, 12209 Westmont Lane, Bowie, Md. 20715

[22] Filed: Sept. 1, 1970

[21] Appl. No.: 68,714

[52] U.S. Cl. ........................325/55, 325/64, 325/66, 325/309, 325/311, 325/392

[51] Int. Cl. ..............................................H04b 1/00

[58] Field of Search......................325/30, 48, 53–55, 325/63, 64, 66, 187, 308–311, 466, 392, 393; 343/200, 226, 228; 340/224

[56] References Cited

UNITED STATES PATENTS 3,534,266 10/1970 Halstead......................325/64
3,283,251 11/1966 Murphy.......................325/66
3,436,662 4/1969 Kobayashi...................325/66

*Primary Examiner*—Albert J. Mayer
*Attorney*—Robert H. Epstein

[57] ABSTRACT

A selective broadcast communication system including a transmitting station for broadcasting programs, each program being preceded by program and subscriber identifying codes and followed by a stop code, and a plurality of subscriber stations receiving the transmitted programs and codes, each of the subscriber stations being selectively operable to reproduce only those programs which were preselected by detecting the program and subscriber identifying codes and determining the coincidence thereof with the preselected program and with a subscriber module such that preselected programs may be recorded by authorized subscribers automatically.

13 Claims, 5 Drawing Figures

INVENTOR,
RICHARD J. OTERO

BY Robert H. Epstein
ATTORNEY

INVENTOR.
RICHARD J. OTERO
BY [signature]
ATTORNEY

INVENTOR,
RICHARD J. OTERO

BY Robert H Epstein
ATTORNEY

BROADCAST COMMUNICATION SYSTEM INCLUDING A PLURALITY OF SUBSCRIBER STATIONS FOR SELECTIVELY RECEIVING AND REPRODUCING ONE OR MORE OF A PLURALITY OF TRANSMITTED PROGRAMS EACH HAVING A UNIQUE IDENTIFYING CONE ASSOCIATED THEREWITH

BACKGROUND OF THE INVENTION

1. Field of the Invention

The present invention pertains to communication systems and more particularly to broadcast communication systems permitting automatic reproducing of preselected programs by authorized subscribers.

2. Discussion of the Prior Art

Broadcast communication systems play an important and vital role in contemporary living in that many people rely to a great extent on such communication media for information with respect to a wide variety of subjects such as world, national and local news events, business news, news analysis, editorial comment, sports news and other recreational, leisure-time and academic interests. While broadcast communication systems such as radio and television are utilized extensively, such systems have as yet not reached their full potential in the informing of the general public.

One problem existing in present broadcast communication systems is that programs are broadcast at predetermined times requiring a listener to be tuned in at that time in order to participate and learn from the program. That is for example, news programs are normally transmitted by radio and television stations at predetermined time periods throughout the day; and, if one's business or other duties prevent him from listening at those predetermined times, he is prevented from exposure to the news via the broadcast communication systems; and, therefore, will either miss perhaps important news details and items or will have to rely on another source of information, such as the newspapers, to gain such information. Of course, the most propitious and expeditious manner in which to understand or gain information is by listening, since such may be performed while other tasks are also being performed, such as driving a vehicle or dining. Thus, newspapers are not always an adequate substitute for missed information broadcast via radio or television communication systems.

Radio and television systems are normally utilized only during the hours from early morning to late evening; and, accordingly, there is a good portion of available broadcast time which is not utilized at all. This presents a disadvantage from both the broadcasting and listening standpoint in that the broadcaster is deprived of additional revenue and the listener is deprived of information which could be broadcast during these normally dead periods. While broadcast communication systems are wasting this time, various special interest groups are suffering from a lack of information which could be provided during this dead time. Examples of such groups include, among others, doctors, lawyers, engineers, scientists, accountants, various hobbyists, and the physically handicapped, such as the blind. The above-mentioned groups, as well as many groups of people with special interests, have need for information which they can receive only by means costly to them in both money and time, and many of these groups are completely without recourse to complete information in which they are vitally interested.

For instance, a good doctor must keep abreast of developments within his general or specialized field in order to treat patients in the best manner. Similarly, a lawyer must keep abreast of the development of the law as interpreted by courts and promulgated by legislatures in order to best advise his clients. It has been proposed to record on cassettes information desired by the above two groups and to disseminate same for reproducing by members of the groups at any desirable time, such as while commuting to and from work. Such a method of disseminating this vital information has been found to be extremely expensive and not flexible enough to provide changing and up-to-date information within a reasonable time. That is, a doctor or a lawyer might receive one cassette a month containing information pre-recorded thereon; however, such information or data may be stale by the time it reaches the doctor or lawyer. Another problem exists in that while this single monthly recording is expensive, it does not make use of all of the available time of the professional man; and, therefore, he is not adequately informed. As will be appreciated, various special interest groups such as those sharing the same hobby have requirements for specialized information which cannot be disseminated at a reasonable cost.

The physically handicapped, such as the blind, suffer from a great delay in the translating of various news events and articles of an editorial nature into Braille for dissemination and often are informed only when the information is stale and perhaps nonapplicable to the situation existing at that time. Furthermore, such translations are extremely expensive as is the recording on records of various magazines of general interest which are published weekly or monthly. The physically handicapped, therefore, suffer from a lack of information due merely to the mechanics of providing such information to the handicapped person, and further suffer due to the expense of obtaining such information.

SUMMARY OF THE INVENTION

Accordingly, it is an object of the present invention to modify existing broadcast communication systems to provide information and data to various groups without interfering with or materially increasing the cost of normal broadcasting.

The present invention is generally characterized in a selective broadcast communication system including a transmitting station including a transmitter which receives a plurality of programs to be broadcast, and a program identification code generator for supplying a plurality of program identifying codes to the transmitter, each code being different and one of the codes being supplied to the transmitter before each of the programs such that each program is individually identifiable; and a plurality of subscriber stations each including a receiver, a reproducer, control means interconnecting the receiver and the reproducer to selectively supply the programs from the receiver to the recorder, and a code detector having a plurality of states each associated with one of the program identifying codes and each being selectively actuated, the code detector receiving the codes and comparing the codes with the selectively actuated states to operate the control means to supply a preselected program to the reproducer when the program identifying code preceding the preselected program is received whereby selected ones of the programs may be recorded automatically.

Another object of the present invention is to construct a subscriber station which is automatically responsive to preselected broadcasted programs to reproduce such preselected programs.

A further object of the present invention is to transmit program and subscriber identification codes prior to the transmission of a program and a stop code after the program such that a subscriber station may be automatically tuned in to a preselected program and turned off after termination of the transmission of the program.

The present invention has another object in that a subcarrier of an FM transmission is utilized as a communication media for a selective broadcast communication system.

Another object of the present invention is to use pulse code modulated signals to permit only authorized subscribers to receive and record broadcasted programs.

A yet further object of the present invention is to provide a subscriber unit which may be automatically programmed to record preselected broadcasted programs and which may be simply modified to permit only authorized subscribers to listen to such programs.

Some of the advantages of the present invention over the prior art are that the communication system of the present invention can be utilized during dead broadcasting time and is therefore extremely economical, broadcasted programs may be recorded on cassettes and listened to at any desirable time by a subscriber, a great variety of special and general interest programs may be broadcasted with individual subscribers having the choice of listening to or recording only those programs in which they have an interest, the number of subscribers which can avail themselves of the system is virtually unlimited, and the equipment required to effect operation of the system is inexpensive thereby decreasing subscriber costs.

Other objects and advantages of the present invention will become apparent from the following description of the preferred embodiment, taken in conjunction with the drawings.

DESCRIPTION OF THE PREFERRED EMBODIMENT

While a communication system constructed in accordance with the present invention may be utilized with any suitable broadcast communication media such as AM radio and television, it is especially advantageous for use with FM, that is, frequency modulated, broadcasting systems. The great advantage of utilizing the communication system of the present invention with FM broadcasting is that in the United States FM stations are granted a subcarrier frequency which exists in their allotted range but is not required for normal FM transmissions. Such subcarriers, which hereinafter will be referred to as SCA, are normally rented or leased for the provision of uninterrupted programs such as music for offices, etc. While SCA is available, many FM stations do not utilize or lease their SCA; and, furthermore, SCA is normally dead or not utilized during night hours. The present invention will be described hereinafter for use with an FM–SCA transmitting system; however, while the present invention has distinct advantages when used with such an SCA system, it is not limited thereto and may be utilized with any suitable communications media.

Figure 1:
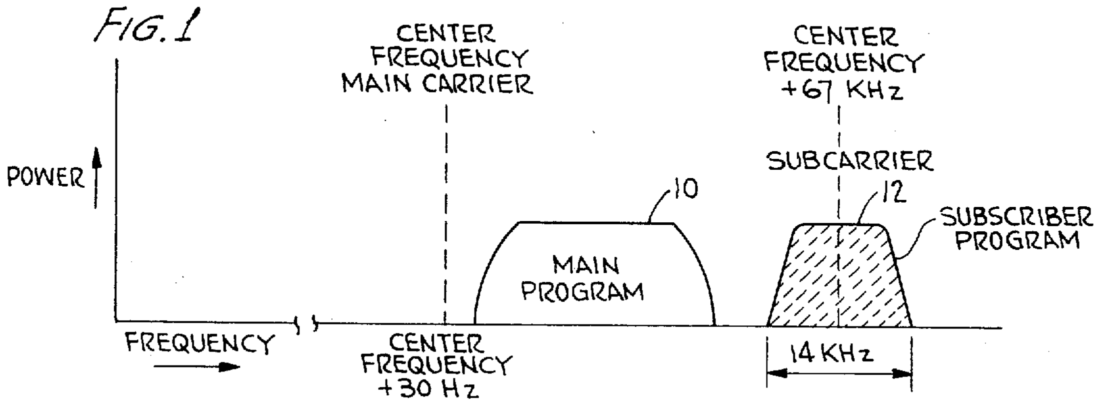
FIG. 1 is a chart illustrating the transmission spectrum of FM and subcarrier communication frequencies.

An exemplary transmitter spectrum utilization chart is shown in FIG. 1, wherein it may be seen that the main program 10 broadcast by an FM station is located adjacent the main allotted carrier center frequency at a position between + 30 Hz and + 30 KHz. The center frequency of the allotted subcarrier, or SCA, is spaced 67 KHz from the main carrier center frequency, and a subcarrier program 12 will normally utilize 14 KHz around the subcarrier center frequency. Thus, it may be seen that a subcarrier program may be transmitted simultaneously with a main program without interference therewith and may be transmitted by a conventional FM transmitter with only minimal cost increase.

Figures 2, 4:
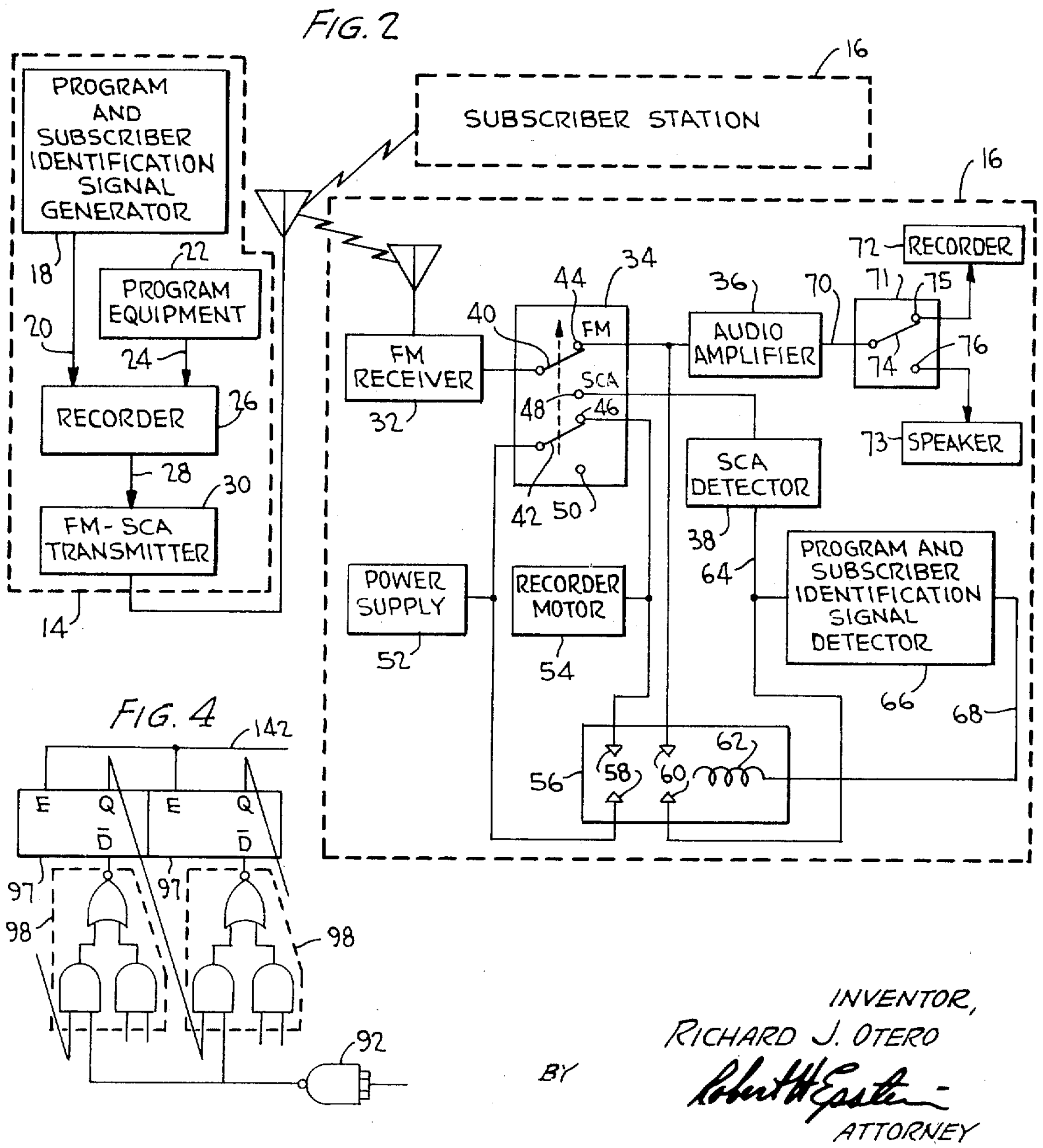
FIG. 2 is a schematic block diagram of a selective recording communication system according to the present invention.
FIG. 4 is a schematic diagram of two stages of the shift register of FIG. 3.

A communications system in accordance with the present invention is illustrated in FIG. 2, and includes a transmitter station 14 and a plurality of subscriber stations 16 which are adapted to receive electromagnetic signals from the transmitting station. Each of the subscriber stations will be substantially identical; and, accordingly, only one is illustrated with the understanding that as many subscriber stations may be provided as are desirable in the same manner as AM and FM radio receivers may be utilized without limit to receive radio broadcasts.

Transmitting station 14 includes a program and subscriber identification signal generator 18 which provides coded signals at an output 20 thereof identifying the program to be transmitted immediately thereafter and a special code such that only authorized subscriber stations may receive the program. Program equipment 22 has an output 24 supplied to a recorder 26 along with output 20 from generator 18, and program equipment 22 may include any suitable equipment for producing a program which may include special interest information, data, music, editorials, or any desired material to be communicated. As will be explained in more detail hereinafter, signal generator 18 provides a code immediately preceding a program produced at equipment 22 and a code at the end of such a program and such programs including the codes are recorded at recorder 26 for transmission via an output 28 to a conventional FM–SCA transmitter 30. As will be appreciated, a complete program can be compiled and recorded at any time and supplied to transmitter 30 for broadcasting during any desirable time period. Of course, complete programs may be directly supplied to transmitter 30 without recording.

The components of subscriber station 16 may be assembled in a single unit and include a conventional FM receiver 32 supplying an FM output through a switch 34 adapted to be mounted on a panel of the unit to an audio amplifier 36 which may include an FM detector and to an SCA detector 38, selectively. Switch 34 includes ganged switch blades 40 and 42 which are adapted in a first position to connect with contacts 44 and 46, respectively, and in a second position to connect with contacts 48 and 50, respectively. Switch blade 42 is connected with a power supply 52 which supplies electrical power to a recorder motor 54 via switch blade 42 and contact 46 or through a control relay 56 which includes a first pair of contacts 58 and a second pair of contacts 60 operable in response to energization of a coil 62. Contacts 58 are connected between recorder motor 54 and power supply 52, and contacts 60 are connected between the input to audio amplifier 36 and an output 64 from SCA detector 38. A program and subscriber identification signal detector 66 receives the SCA detected output 64 and is operative to control the energization of coil 62 through an output 68 such that an SCA program can be supplied as an input to audio amplifier 36 only when a selected program is being transmitted and the receiver is an authorized subscriber. Audio amplifier 36 has an output 70 supplied through a panel switch 71 to either a recorder 72 or a speaker 73, depending on the position of a switch blade 74 in switch 71 in connection with either a contact 74 or a contact 76. It will be appreciated that reproducing means other than recorder 72 and speaker 73 may be utilized depending upon the application of the system.

Recorder 26 at transmitting station 14 may be any suitable high fidelity recorder such as a Tandberg magnetic tape recorder Model 64X, and recorder 72 at subscriber station 16 is preferably a cassette or cartridge recorder such that after recording, the tape cassette may be removed therefrom and replayed at another time and place. One example of a tape recorder 72 which may be utilized with the present invention is Sony Model TC–110. SCA detector 38 may be any standard, commercially available SCA detector now utilized for programs such as those mentioned above, and FM–SCA transmitter 30 and FM receiver 32 are conventional.

Figure 3:
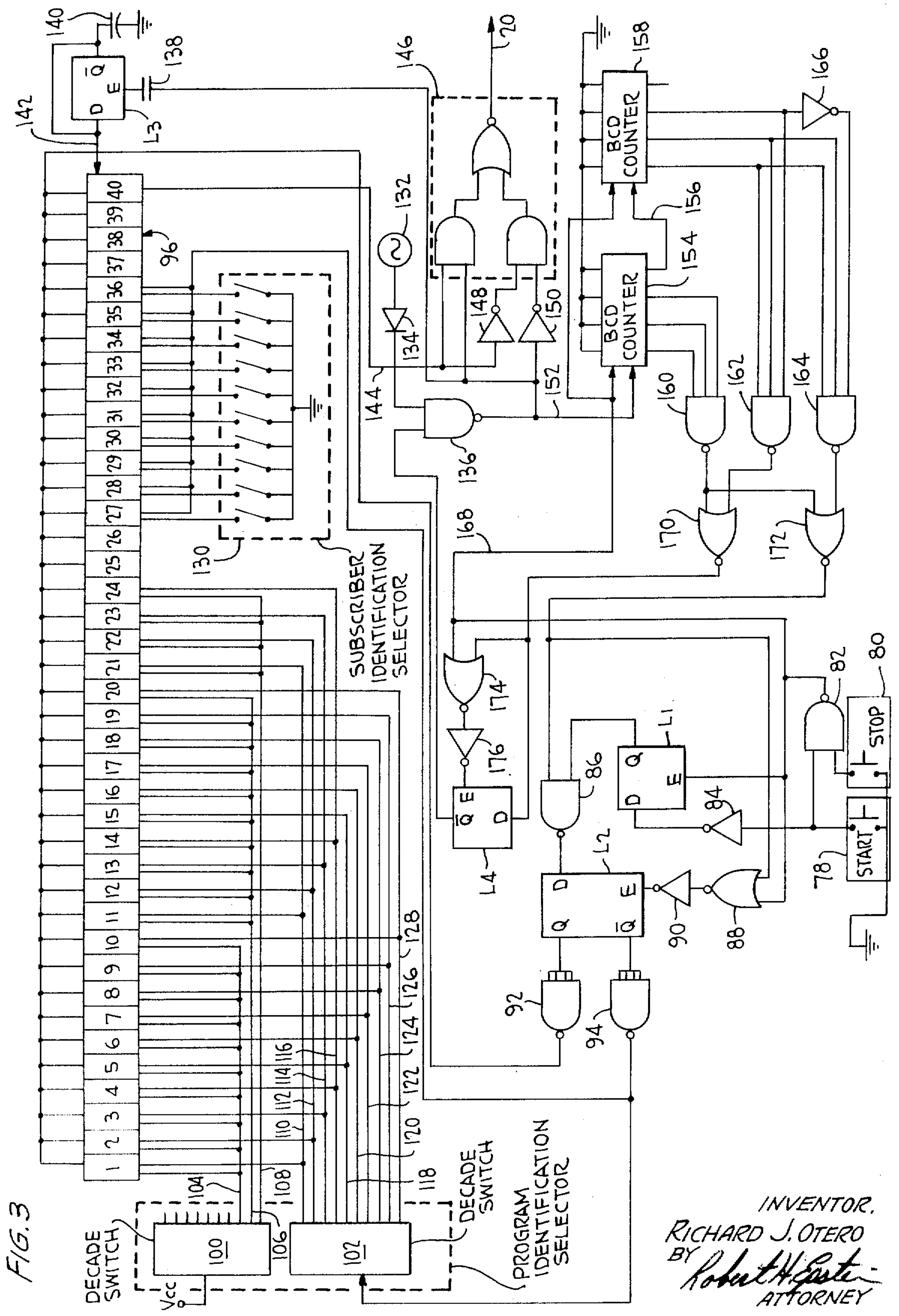
FIG. 3 is schematic diagram of the program and subscriber identification signal generator of the system of FIG. 2.

Signal generator 18 at transmitting station 14 is an important component of the present invention and is illustrated in FIG. 3, to be described in detail hereinafter, and similarly, signal detector 66 at subscriber station 16 is vital to the present invention and will be described in detail with respect to FIG. 4.

In describing the above components, reference is made to NOR and NAND gates, half adders, inverters and latches which are conventional logic circuits operating on 1 logic. The NOR gates may be any of Signetics Model Nos. N8885A or N8815A, and the NAND gates may be any of Signetics Model Nos. N8881A, N8816A or N8808A depending upon the number of inputs required. The NOR gates are operative to provide a 0 whenever a 1 is present at any input and a 1 when all inputs are 0, and the NAND gates are operative to provide 1 whenever a 0 is present at any input and a 0 when all inputs are 1. The inverters may be Signetics Model No. N8490A and are utilized merely to invert an input signal; that is, change a signal from a 0 to a 1 or a 1 to a 0. The latches may be Signetics Model N8275B and each has an enable input E responsive to a 1, a data input D, and Q and $\bar{Q}$ outputs. When a 1 is present at E the signal at D will appear at Q and be inverted at $\bar{Q}$. The half adders include a pair of AND gates each having two inputs with the outputs thereof supplying inputs to a NOR gate. The operation of the half adders is conventional and is not described in detail.

The program and subscriber identification signal generator 18 is illustrated in FIG. 3 and includes a start switch 78 and a stop switch 80 each having one contact grounded and the other contact connected as an input to a NAND gate 82 which has its output supplied as an enable input L1E to a latch L1. The other contact of start switch 78 is supplied through an inverter 84 to the data input L1D of latch L1 and the Q output L1Q of latch L1 is supplied as an input to a NAND gate 86. The output of NAND gate 82 is also supplied as an input to a NOR 88 which has its output inverted at 90 and supplied to an enable input L2E of a latch L2 which receives a data input L2D from the output of NAND gate 86. Latch L2 has outputs L2Q and L2$\bar{Q}$ connected with 4-input NAND gates 92 and 94, respectively, which NAND gates are utilized as inverters to provide sufficient power to drive a shift register generally indicated at 96.

Shift register 96 has forty stages numbered consecutively, and each stage includes a latch 97 having enable and data inputs E and $\bar{D}$, respectively, and a Q output. In FIG. 4 two consecutive stages of shift register 96 are illustrated, and it may be seen that each shift register stage includes a half adder 98 which receives inputs from the preceding stage of the shift register, from gate 92 and from program identification selector decade switches 100 and 102 which are manually or automatically operable to energize selective outputs thereof to provide an identification code for a program. Decade switch 100 has three outputs 104, 106 and 108 with output 104 connected with the half adder 98 of each of stages 1 through 10, output 106 connected with the half adder 98 of stages 11 through 20, and output 108 connected with the half adder 98 of stages 21 through 24. Similarly, decade switch 102 has ten outputs with an output 110 connected with the half adder 98 of stages 1, 11 and 21 of the shift register, an output 112 connected with the half adder 98 of stages 2, 12 and 22 of the shift register, an output 114 connected with half adder 98 of stages 3, 13 and 23 of the shift register, an output 116 connected with the half adder 98 of stages 4, 14 and 24 of the shift register, an output 118 connected with half adder 98 of the stages 5 and 15 of the shift register, an output 120 connected with the half adder 98 of stage 6 and 16 of the shift register, an output 122 connected with the half adder 98 of stages 7 and 17 of the shift register, an output 124 connected with the half adder 98 of stages 8 and 18 of the shift register, an output 126 connected with the half adder 98 of stages 9 and 19 of the shift register, and an output 128 connected with the half adder 98 associated with stages 10 and 20 of the shift register. Decade switch 100 receives its power from a source Vcc and decade switch 102 receives it power from the output of NAND gate 94. Stages 25, 26, 37 38, 39 and 40 of the shift register are tied to provide continuous 0 or 1 outputs dependent upon the code selected to be used, and stages 27 through 36 of the shift register receive inputs from a subscriber identification selector 130 which includes ten switches which may be selectively closed to provide associated stages 27 through 36 with selected inputs such that only authorized subscribers may tune in to broadcasted programs as will be explained hereinafter. The half adders 98 associated with stages 27 through 36 receive inputs from selector 130 and NAND gate 94 as compared with the half adders 98 of stages 1–24 which receive inputs from the program identification selector.

An oscillator 132 has its output connected through a diode rectifier 134 to a NAND gate 136 which has its output connected through a capacitor 138 to the enable input L3E of a latch L3. Latch L3 has a data input L3D and a $\overline{Q}$ output L3$\overline{Q}$ tied together and through a capacitor 140 to ground, and L3D is also connected with the enable input E of each latch 97 of shift register 96, as shown schematically by lead 142.

The Q output of stage 40 of shift register 96 supplies inputs over lead 144 to a half adder 146 directly and through an inverter 148; and, similarly, the output from NAND gate 136 is supplied as the other two inputs to half adder 146 with one being inverted at 150. The output of NAND gate 136 is also supplied via lead 152 as a clock input to a binary coded decimal counter 154 which has carry output 156 supplied as an input to a second binary coded decimal counter 158. The first three stages of counter 154 have outputs connected to a NAND gate 160 such that NAND gate 160 is enabled only when counter 154 counts 7; and, similarly, a NAND gate 162 receives the outputs of the first three stages of counter 158 such that NAND gate 162 is enabled only when counter 158 receives 7 pulses. A Nand gate 164 is connected directly with the outputs from the first two stages of counter 158 and with the output of the third stage through an inverter 166 such that NAND gate 164 is enabled only when counter 158 receives three pulses. Counters 154 and 158 each receive clear pulses on a lead 168 from the output of NAND gate 82.

A NOR gate 170 receives the outputs from NAND gates 160 and 162 and supplies an input to a NOR gate 174 which also receives the output of NAND gate 82. The output of NOR gate 174 is inverted at 176 and supplied to an enable input L4E of a latch L4 which receives a data input L4D from the output of NOR gate 170 and supplies an output L4$\overline{Q}$ to NAND gate 136. A NOR gate 172 receives inputs from NAND gates 162 and 164 and supplies inputs to NAND gate 86 and NOR gate 8.

Figure 5:
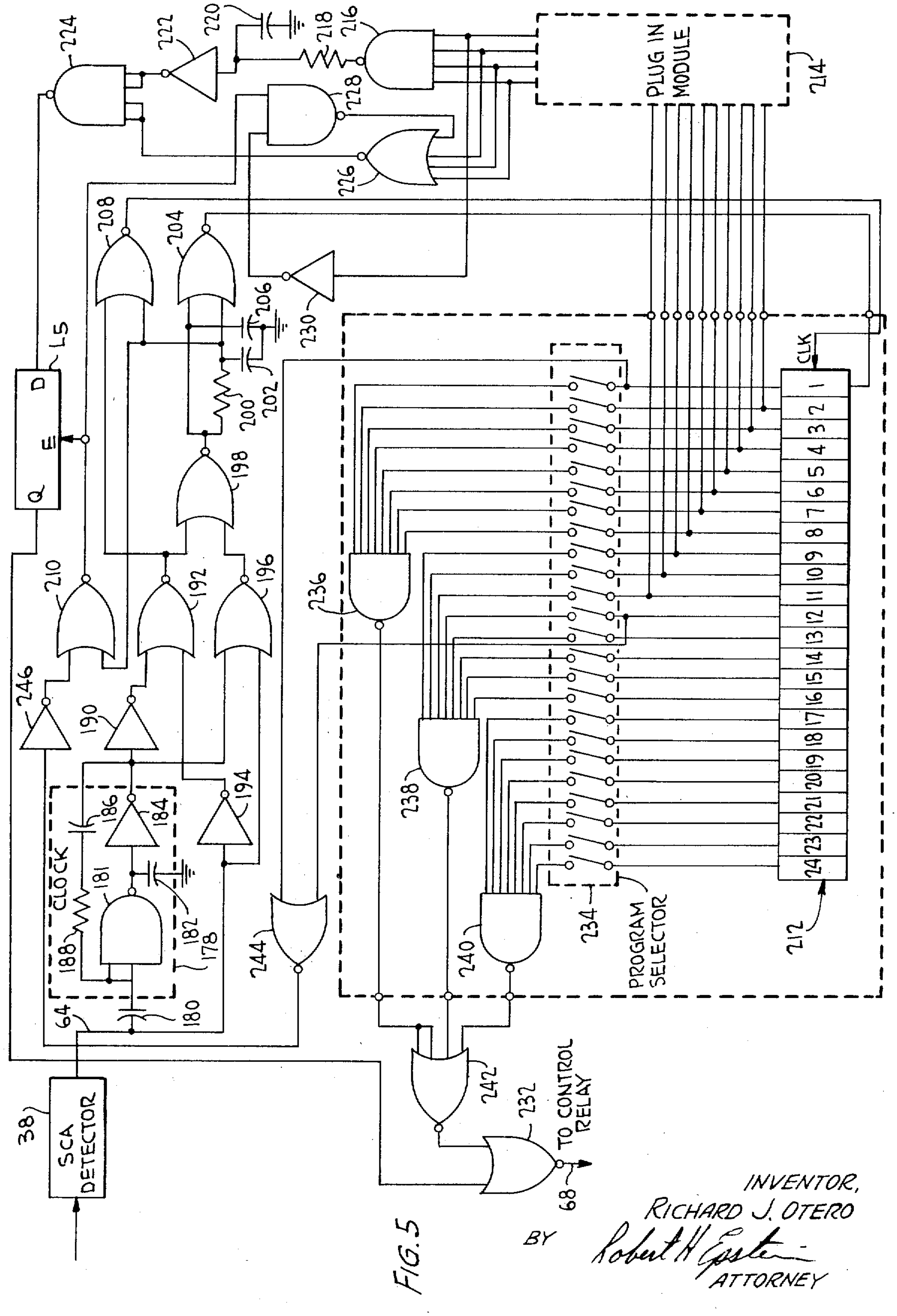
FIG. 5 is a schematic diagram of the program and subscriber identification signal detector of the system of FIG. 2.

The program and subscriber identification signal detector 68 is illustrated in FIG. 5 and includes a clock circuit 178 which receives signals from SCA detector 38 through a coupling capacitor 180. Clock 178 includes a NAND gate 181 having an output connected to ground through a capacitor 182 and to an inverter 184 which has an output fed back through a capacitor 186 and a resistor 188 to the input of NAND gate 181. The output of clock 178 is inverted at 190 and supplied as an input to a NOR gate 192 which receives a second input from output 64 of SCA detector 38 through an inverter 194. The output 64 from SCA detector 38 is also supplied to a NOR gate 196 along with the output from clock 178, and the outputs of NOR gates 192 and 196 are supplied as inputs to a NOR gate 198 that has an output connected to ground through a resistor 200 and a capacitor 202. The junction of resistor 200 and capacitor 202 is connected with an input of a NOR gate 204 which has a second input connected with ground through a capacitor 206 and directly to the output of NOR gate 198. The junction of resistor 200 and capacitor 202 is also tied to an input of a NOR gate 208 which receives a second input from the output of NOR gate 192 and is further tied to the input of a NOR gate 210.

The output of gate 204 supplies input pulses to the data input of the first stage of a 24-stage shift register 212 which is constructed in the same manner as shift register 96 of the FIG. 3. NOR gate 208 supplies clock pulses to the enable inputs of each stage of shift register 212 in the same manner as clock pulses are supplied via lead 142 in FIG. 3. The outputs of stages 2 through 10 of shift register 212 are connected to a prewired plug-in module 214 has four outputs supplied to a NAND gate 216. The output of NAND gate 216 is connected to ground through a resistor 218 and a capacitor 220, and the junction thereof is connected through an inverter 222 to a NAND gate 224 that has an output supplying a data input L5D to a latch L5. Three of the outputs from module 214 are also supplied to a NOR gate 226 which receives a fourth input from a NAND gate 228 and supplies an output to NAND gate 224. NAND gate 228 receives one input from the fourth output of module 214 after inversion at an inverter 230 and another input from the output of NOR gate 210 which also supplies an enable input L5E to latch L5. Latch L5 has an output L5Q supplying an input to a NOR gate 232.

The Q output of each stage of shift register 212 is connected with a switch of a program selector switch 234, and the first eight switches thereof are connected with a NAND gate 236, the second eight switches thereof are connected with a NAND gate 238 and the third eight switches thereof are connected with a NAND gate 240. The outputs of gates 236, 238 and 240 are supplied as inputs to a NOR gate 242 which has its output supplying an input to NOR gate 232. The Q outputs of stages 1 and 12 are also connected with a NOR gate 244 that supplies an input through an inverter 246 to NOR gate 210.

In operation, programs are recorded at transmitting station 14 and transmitted during dead or non-transmitting time. The specific embodiments of the program and subscriber identification signal generator and detector above described contemplate the transmitting of 24 programs. That is, normal dead time spans the six hours between 12:00 midnight and 6:00 A.M., and the programs to be transmitted are to be of fifteen-minute duration. It will be appreciated, however, that the embodiments may be modified to accommodate any suitable number of programs having any desired duration. As programs are recorded, signal generator 18 is activated to provide an identification code preceding and after each program.

In order to activate signal generator 18 at the beginning of a program, start button 78 is momentarily depressed to supply a 0 to NAND gate 82 and provide a 1 at the output thereof. The 1 at the output of NAND gate 82 clears counters 154 and 158 via lead 168, enables NOR gates 88 and 174 to provide 0's at the outputs thereof which are inverted at 90 and 176 to enables latches L2 and L4 and directly enables latch L1. After release, button 78 returns the output of NAND gate 82 to 0 to permit operation of counters 154 and 158 after clearing.

Prior to depression of start button 78, NAND gate 136 will receive a 0 from latch L4 and will prevent a clock pulse from being generated at the output of NAND gate 136 in response to oscillator 132 since, with the presence of a 0 at an input of NAND gate 136 a 1 will always appear at the output. Accordingly, there will be no clock output to latch L3 and no clock input to shift register 96; and, therefore, since the inputs to half adder 146 do not change, the output 20 thereof will be constant to supply no identification signal to recorder 26. However, once start button 78 is depressed and latch L4 is enabled as described above, NAND gate 136 will continuously receive a 1 from output L4$\overline{Q}$ and will provide clock pulses at the output thereof in a form of alternating 0's and 1's. That is, since counters 154 and 158 have been cleared, NAND gates 160, 162 and 164 will receive 0's from the counter stages with the exception of the 1 from inverter 166; and, accordingly, NOR gates 170 and 172 will each receive two 1 inputs and have 0 outputs. The 0 from NOR gate 170 is supplied to data input L4D, and latch L4 therefore provides a 1 at output L4$\overline{Q}$.

Counter 154 receives clock pulses from NAND gate 136 via lead 152, and counter 154 counts to ten and then provides a pulse to counter 158 via lead 156. As previously mentioned, NAND gate 160 receive 1's from first three stages of counter 154 each time the counter counts to 7; and, similarly, NAND gate 162 receives 1's from the first three stages of counter 158 each time the counter counts to 7. NAND gate 164 receives 1's from counter 158 each time the counter counts to three due to the first two stages providing 1's and the third stage providing a 0 which is changed to a 1 by inverter 166. Thus, NOR gate 170 will provide a 1 when counters 154 and 158 have counted 77 clock pulses, and NOR gate 172 will provide a 1 when counters 154 and 158 have counted 37 clock pulses.

Clock pulses from NAND gate 136 are also supplied to enable input L3E of latch L3 which is operative to provide a clock or shift pulse on lead 142 each time a 1 appears at the output of NAND gate 136. As previously mentioned, the clock pulses are supplied to the enable input of the latch 97 of each stage such that the shift register 96 is synchronized with the clock pulses supplied to half adder 146.

NAND gates 86 and 88 each receive the 0 output from NOR gate 172 after start button 78 is depressed, and NAND gate 86 supplies a 1 to data input L2D of latch L2 such that output L2Q is a 1 and output L2$\overline{Q}$ is a 0. NAND gate 92, therefore, supplies a 0 to each half adder 98 of each stage of shift register 96, and NAND gate 94 supplies a 1 to the half adder 98 of stages 27–36 of the shift register. Decade switches 100 and 102 are operated prior to depression of start button 78 such that one of outputs 104, 106 and 108 one of outputs 110, 112, 114, 116, 118, 120, 122, 124, 126 and 128 have 1's thereon whereby one of the AND gates of one half adder 97 will have two 1's applied thereto such that the latch 97 associated with the one half adder will have a 0 supplied to its data input whereas the remainder of the latches 97 will have 1's supplied to their data inputs. That is, the 0 from NAND gate 92 causes one AND gate of each half adder 97 to have a 0 output and all of the other AND gates will have 0 outputs except the other AND gate in the one half adder. For example, if the number 17 is set into the program identification selector by actuating a one in switch 100 and a seven in switch 102, 1's will be provided on outputs 106 and 122 to place 0 in latch 97 of stage 17 of the shift register.

Subscriber identification selector 130 will have four of the switches therein continuously closed with the closed switches being randomly selected and changed after any convenient period of time as will be explained hereinafter. One AND gate of the half adders 97 associated with stages 27–36 of the shift register receives the output of the preceding stage and the output of NAND gate 92, and the other AND gate receives the output from NAND gate 94 and the outputs from subscriber identification selector 130. Thus, those four stages which have closed switches associated therewith will store 0's whereas the remaining stages will store 1's.

With the operation as above described after start button 78 has been depressed, it can be seen that half adder 146 will provide an output of alternating 1's and 0's in response to the clock output from NAND gate 136. Shift register 96 will remain in the initially established state for the first 36 clock pulses because the 0 from NAND gate 92 inhibits the half adder 98 to prevent shifting of data.

On the thirty-seventh clock pulse NAND gate 160 and 164 are enabled, and a 1 is supplied on the output of NOR gate 172. NAND gate 86 accordingly supplies a 0 input L2D which causes outputs L2Q and L2$\overline{Q}$ of latch L2 to change to 0 and 1, respectively. The outputs of NAND gates 92 and 94 are thus 1 and 0, respectively, to de-energize decade switch 102 and enable half adders 98 of the shift register such that data in the stages may be shifted with each clock pulse on lead 142.

The output 20 thereafter supplies 40 pulses including all of the data stored in the shift register which modulates the alternating 1's and 0's from NAND gate 136 in accordance with the program and subscriber identification code. After the 40 pulses are generated, shift register 96 is cleared, and a total of 77 pulses will have been generated. NAND gates 160 and 162 will be enabled at this time such that NOR gate 170 provides a 1 to data input L4D of latch L4 to change output L4$\overline{Q}$ to a 0 and inhibit NAND gate 136 to stop the generation of clock pulses.

The pulse output at 20 is recorded immediately prior to a program to be transmitted, and at the end of the program a stop code is recorded. Stop button 80 is depressed to initiate the generation of the stop code and places a 0 at NAND gate 82 which supplies a 1 to NOR gate 88 and a 1 to enable input L2E of latch L2. Since the counters are cleared by the 1 from NAND gate 82, a 1 is supplied to the data input L2D of latch L2 whereby NAND gates 92 and 94 have a 0 and 1 at their respective outputs. Latch L4 is enabled via NOR gate 174, and NAND gate 136 receives a 1 from output L4Q̄ in response to the 0 received at data input L4D from NOR gate 170.

Once 37 clock pulses are passed by half adder 146 to output 20 and counted in counters 154 and 158, NAND gates 160 and 164 are enabled to provide a 1 at the output of NOR gate 172. NAND gate 86 is not enabled at this time since latch L1 was not enabled by the depression of stop button 80; and, thus, NAND gates 92 and 94 do not change stages thereby continuing to inhibit shifting of data in shift register 96. After the generating of 40 more pulses to make a total of 77 NAND gates 160 and 162 will be enabled to cause NOR gate 170 to supply a 1 to the data input L4D of latch L4, and output L4Q̄ therefore goes to 0 to inhibit NAND gate 136 and stop the generating of clock pulses.

The entire sequence described above is repeated for each program to be transmitted with a different program identification code provided for each program by varying the 24 selections available in decade switches 100 and 102 of the program identification selector.

An authorized subscriber will review a list of the programs to be transmitted during any period, in the example, the 24 15-minute programs to be transmitted during each day, and will select those programs in which he is interested for reproducing by closing appropriate ones of the switches in program selector 234. Of course, the program listing will indicate the number identifying each program such that program selector 234 has a plurality of states each corresponding to the identifying code for each program. Any number of programs may be preselected with the only limitation being the length of recording time provided by the recorder 72 especially when cassettes or cartridges are used therewith.

Plug-in module 214 is prewired in a specific manner such that it is operative to supply 0's on the four outputs thereof to NAND gate 216 only when the correct four inputs to the plug-in module have 0's thereon. The purpose of the plug-in module is to permit only authorized subscribers to monitor a transmitted program and during predetermined time periods the plug-in module will be changed along with the subscriber code generated from subscriber identification selector 130 at the transmitting station such that only those who have received the changed plug-in module may listen to transmitted programs. That is, assuming that a subscriber pays a fee for the programming service, only authorized subscribers who have paid the fee will receive the correct changed plug-in module to be simply inserted in their subscriber unit.

With the plug-in module in place and program selector 234 pre-actuated to provide existing states therefor the operation of subscriber station 16 will be described. If it is desired to record an SCA program, panel switch 34 is actuated to connect SCA detector 38 through switch blade 40 to FM receiver 32 and the output 64 of SCA detector 38 will be supplied to program and subscriber identification signal detector 66. The first information received will be a series of 36 alternating 1 and 0 pulses, which pulses are supplied to clock circuit 178 for synchronization purposes and through inverter 194 to NOR gate 192 and directly to NOR gate 196. The clock pulses from clock circuit 178 are supplied directly to NOR gate 196 and through inverter 190 to NOR gate 192 in synchronization with the received clock pulses. Thus, it will be seen that the outputs of NOR gates 192 and 196 will initially be alternately 1's and 0's such that the output of NOR gate 198 is a continuous 0.

In the quiescent state, capacitors 202 and 206 will be fully charged via the bias voltage utilized for NOR gate 198 thereby causing NOR gates 204 and 208 to provide 0's at the outputs thereof. The 36 alternating clock pulses will thus provide a 0 at the output of NOR gate 198 to permit capacitors 200 and 202 to discharge, thereby producing a 0 at the inputs of NOR gates 204 and 208. Once the capacitors are discharged the alternating 1 and 0 input to NOR gate 208 from NOR gate 192 provides an alternating series of 1's and 0's at the output thereof, which output is supplied to shift register 212 as a clock or shift pulse to move the output signal from gate 204 through the register.

After the first 36 pulses have been received the subscriber identification code originally stored in stages 27 through 36 of shift register 96 at the transmitting station are received and are combined with the clock pulses to load shift register 212 in accordance with the output of NOR gate 204. If the received code and the clock are alike during any pulse duration, the output at NOR gate 204 will be a 1, whereas if the received code and the clock are not alike, the output from NOR gate 204 will be a 0. It will be appreciated that capacitors 202 and 206 will remain discharged during the receipt of both the program and subscriber identification codes since the majority of signals during the coding sequence will be 0's. When the proper subscriber identification code is received plug-in module 214 will supply 0's on all four of its outputs in response to coinciding Q output 0's in each appropriate stage of shift register 212 with the first and twelfth stages thereof representing a 0 in accordance with stages 26 and 37 of shift register 96.

The four 0's supplied to NAND gate 216 provide a 1 at the output thereof; however, capacitor 220 is normally discharged to provide a 0 to inverter 222 such that a 1 is supplied to NAND gate 224. The 0's from stages 1 and 12 are supplied to NOR gate 244 to provide a 1 at the output thereof which is inverted at 226 and supplied to NOR gate 210 along with a 0 from the junction of resistor 200 and capacitor 202 to provide a 1 at the output thereof. The 1 from NOR gate 210 is supplied to NAND gate 228 along with a 1 from the output of plug-in module 214 after inversion at 230 such that a 0 is supplied to the fourth input of NOR gate 226 to provide a 1 output to the second input of NAND gate 224, thereby providing a 0 output to the data input D of latch L5. The 1 at the output of NOR gate 210 is also supplied to the enable input E of latch L5 such that the 0 at the data input D is supplied at the Q output to NOR gate 232.

Following the subscriber identification code is the program identification code which fills register 212 such that only one of the stages thereof will have a 0 at the output thereof. Once the full 40 following pulses from the transmitting station have been received clock 178 will be de-energized thereby leaving the 0 in shift register 212 in its appropriate register position for a time period longer than the clock period which time period is required for operation of NAND gates 236, 288 and 240. If the 0 coincides with any one of the pre-actuated states of program selector 234, the 0 will be supplied to one of gates 236, 238 or 240 and the output of the one of these three gates receiving the 0 will be a 1 which, when supplied to gate 242, will supply a 0 to NOR gate 232. This 0 and the existing 0 from latch L5 will provide a 1 at output 68 which energizes coil 62 of control relay 56 to close contacts 58 and 60. With contacts 58 closed, motor 54 of recorder 72 is energized to permit recording of the ensuing program and with the contacts 60 closed the detected program on output 64 from SCA detector 38 is supplied through amplifier 36 to recorder 72 for reproducing via recorder 72 or speaker 73.

At the conclusion of the program, the sequence of alternating 1 and 0 pulses transmitted in response to the depression of stop button 80 at the transmitting station is operative to discharge capacitors 202 and 206 which have been charged during the program. After capacitors 202 and 206 are discharged, the output of gate 204 will be a 1 and after the shift register is loaded with all 1's and the shift register clock is stopped NAND gates 236, 238 and 234 will provide a 0 output to NOR gate 242 to provide a 1 to NOR gate 232 and de-energize control relay 56. After the de-energizing or turn-off procedure is completed the subscribed unit will be in condition to receive identification codes for the following program to operate selectively in the same manner.

The use of capacitor 220 provides protection from a non-subscriber shorting the wires of plug-in module 214 in an attempt to provide subscription-free operation. If the wires are shorted, a charge will build up on capacitor 220 and, hence, a 0 will be provided to NAND gate 224 to switch latch L5 disenabling NOR gate 235 and de-energizating control relay 56.

From the above it can be seen that program and subscriber identification signal detector 66 is operative to compare selectively actuated states of selector 234 with received program identifying codes to provide a 0 to NOR gate 232 only when there is coincidence therebetween. Similarly, a 0 will be received by NOR gate 232 from latch L5 only when the prewired state of plug-in module 214 coincides with the subscriber identifying code represented in stages 2–11 of shift register 212. The circuitry illustrated with respect to clock 178, capacitors 202, 206 and 220, and the logic may be varied within the scope of the present invention while the general function thereof is maintained. For instance, an emitter follower may be utilized to enhance charging and discharging characteristics of the capacitors, and the number of code pulses generated may be increased to provide better framing of the program and subscriber codes with corresponding logic modifications.

It will be appreciated from the above described operation that with the system of the present invention a subscriber may preselect programs to be recorded and may listen to such programs at his convenience. Thus, a great variety of topics may be included in the programs such that the information needs of virtually all special interest groups can be satisfied.

The system can be expanded by broadcasting on more than one FM frequency simultaneously with the requirement that the FM receiver be tuned to the desired broadcast frequency. Cost to the subscriber is extremely low due to the availability of the information and may be further reduced by the use of distribution systems including various FM stations which pick up an original broadcast and act as a relay station as well as to broadcast the programs to subscribers. In this manner timely information can be communicated throughout the nation without undue cost increase.

Along this line, it should be recognized that the term "program" includes any data which it is desired to broadcast. For instance, the system of the present invention is extremely advantageous for use in communicating securities quotations. In such a case the stock market abbreviation for the security is utilized as the program identifying code, and the cost is the program. For such an application the reproducing means would include a visual display such as Nixie tubes, and the programs would be continuously broadcasted such that the latest quotations would always be available. Similarly, for credit card applications, delinquent accounts can be continuously broadcasted with the credit card account number constituting the program identifying code and the program or information with respect to the account can be the program.

Inasmuch as the present invention is subject to many variations, modifications and changes in detail, it is intended that all matter described in the foregoing application or shown in the accompanying drawings shall be interpreted as illustrative and not in a limiting sense.

What is claimed is:

1. A selective broadcast communication system comprising a transmitting station including transmitter means, program means coupled with said transmitter means to supply a plurality of programs to be broadcast thereto, and program identification means coupled with said transmitter means to supply a plurality of program identifying codes thereto, each of said program identifying codes being different and one of said program identifying codes being supplied to said transmitting means before each of said programs such that each of said programs is individually identifiable;

said transmitter means broadcasting said programs and said program identifying codes; and a plurality of subscriber stations each including receiver means for receiving said braoadcasted programs and program identifying codes, means for reproducing said programs, control means interconnecting said reproducing means and said receiver means, and code detecting means coupled with said receiver means and said control means, and having a plurality of states each associated with one of said program identifying codes and each being selectively actuated, said code detecting means receiving said program identifying codes and comparing said program identifying codes with said selectively actuated states to operate said control means to supply each preselected program to said reproducing means when said program identifying code preceding said preselected program is received whereby selected ones of said programs may be reproduced automatically.

2. The invention as recited in claim 1 wherein said transmitting station includes subscriber identification means coupled with said transmitter means to supply a subscriber identifying code thereto, said subscriber identifying code being supplied to said transmitter means before each of said programs, said code detecting means includes subscriber coincidence means coupled with said control means to provide a signal thereto when said subscriber identifying code received coincides with an authorization code stored in said coincidence means and said control means supplies said preselected program to said reproducing means only in response to said signal from said subscriber coincidence means.

3. The invention as recited in claim 2 wherein said transmitting station includes stop code generator means coupled with said transmitter means to supply a stop thereto after the conclusion of each of said programs, and said code detecting means includes means coupled with said control means and responsive to said stop code to provide a second signal to said control means, said control means being responsive to said second signal to disconnect said reproducing means from said receiver means.

4. The invention as recited in claim 3 wherein said program identifying means and said subscriber identifying means include a shift register with a first plurality of stages storing said program identifying codes and a second plurality of stages storing said subscriber identifying code, gate means controlling the operation of said shift register between a non-shift state and a shift state, counter means controlling said gate means, output means for supplying said program and subscriber identifying codes to said transmitter means, clock means supplying clock pulses to said output means, said shift register and said counter means, said gate means placing said shift register in said non-shift state until said clock means supplies a predetermined number of clock pulses to said counter means and said gate means placing said shift register in said shift state after said predetermined number of clock pulses have been received by said counter means, program selector means connected with said first plurality of shift register stages for supplying said program identifying codes thereto when said shift register is in said non-shift state, and subscriber selector means connected with said second plurality of shift register stages for supplying said subscriber identification code thereto when said shift register is in said non-shift state, said shift register having an output to said output means such that said program and subscriber identifying codes are supplied to said transmitting means when said shift register is in said shift state.

5. The invention as recited in claim 4 wherein said gate means controls said clock means, and said counter means controls said gate means to inhibit said clock means after a second predetermined number of clock pulses have been generated.

6. The invention as recited in claim 5 wherein said stop code means includes a switch connected with gate means to place said shift register in said non-shift state for said second predetermined number of clock pulses whereby said second predetermined number of clock pulses are supplied to said transmitter means to provide said stop code.

7. The invention as recited in claim 5 wherein said code detecting means includes gate means responsive to said first predetermined number of transmitted clock pulses to enable said code detecting means, a shift register receiving said program and subscriber identifying codes, and a plurality of switches each connected with a single stage of said shift register, and and said coincidence means includes a pre-wired plug-in module connected with selected ones of said shift register stages.

8. The invention as recited in claim 3 wherein said transmitter means operates on an FM subcarrier center frequency, and said receiver means includes a subcarrier detector.

9. The invention as recited in claim 1 wherein said reproducing means includes a cassette tape recorder.

10. For use in a broadcast communication system wherein programs are transmitted with preceding program identifying codes, a subscriber unit comprising a receiver for receiving the transmitted programs and identifying codes; code detector means coupled with said receiver to receive the program identifying codes and including selector means having a plurality of preselected states, each state corresponding to one of the transmitted programs and the corresponding program identifying code, said code detector means being responsive to the receiving of a program identifying code corresponding to one of said preselected states to provide an output signal; means for reproducing the transmitted programs; and control means selectively interconnecting said reproducing means and said receiver and coupled with said code detector means, said control means being responsive to said output signal to connect said receiver with said reproducing means whereby preselected programs may be automatically reproduced.

11. The invention as recited in claim 10 wherein said reproducing means is a tape recorder.

12. The invention as recited in claim 11 wherein the programs are further preceded by a subscriber identifying code, and wherein said code detector means includes coincidence means receiving said subscriber identifying code and having an output for supplying a second output pulse to said control means wherein said subscriber identifying code satisfies said coincidence means such that a preselected program can be recorded only by authorized subscribers.

13. The invention as recited in claim 12 wherein said code detector means includes a shift register having a plurality of stages, said selector means includes a plurality of switches each switch being connected with an output of one of said stages such that the outputs of said stage are passed only when a corresponding switch is actuated, and said coincidence means includes a prewired plug-in module receiving outputs from preselected ones of stages.

* * * * *